Dec. 15, 1970     J. W. C. GATES ETAL     3,548,337
ROTARY DEVICES AND APPARATUS

Filed March 13, 1967     4 Sheets-Sheet 1

United States Patent Office 3,548,337
Patented Dec. 15, 1970

3,548,337
ROTARY DEVICES AND APPARATUS
John William Charles Gates and Roy Geoffrey Noel Hall, Teddington, England, assignors to National Research Development Corporation, London, England
Filed Mar. 13, 1967, Ser. No. 622,752
Claims priority, application Great Britain, Mar. 16, 1966, 11,614/66
Int. Cl. H01s 3/00; G02b 17/00
U.S. Cl. 331—94.5                                    3 Claims

ABSTRACT OF THE DISCLOSURE

A scanning apparatus in a gain-switched and Q-switched laser system for rapidly illuminating a fixed point by means of a rotating prism having internal reflecting surfaces.

---

The present invention relates to methods and apparatus for periodically illuminating a fixed point by means of a light beam, more particularly, though not exclusively, at higher frequencies of the order of 10 kc./s.

The invention finds particular application in connection with Q-switched laser applications but is also of useful application in high speed photographic apparatus and other optical scanning systems. In all such applications it is necessary, if a fixed beam source is used, to produce the scanning action by which the beam is caused to pass through the fixed point by means of a moving optical member and at the speeds contemplated the most convenient mode of movement of the optical member is rotation. This in turn presents the problem of meeting the geometrical requirements with regard to the layout of the optical path while at the same time employing a mechanical system suitable for high speed rotation.

The invention overcomes this problem by providing, in addition to improved methods and optical apparatus for scanning a fixed point at high speed, improved arrangements for rotating an optical element at high speed.

According to one aspect of the invention there is provided a method of periodically illuminating a fixed point comprising directing a beam of light to impinge upon a reflective surface and rotating such reflective surface about an axis spaced therefrom on the beam-incident side thereof in such a manner that the reflected beam passes cyclically through said fixed point at a frequency dependent upon the rotational speed of said surface.

According to another aspect of the invention there is provided optical apparatus for periodically illuminating a fixed point with light from a fixed beam source comprising an open-ended housing rotatably arranged about an axis passing through the open end thereof, a reflecting surface disposed inside said housing in spaced confronting relation to said axis but not completely surrounding said axis, and means for rotating said housing and surface about said axis.

Figure 1:
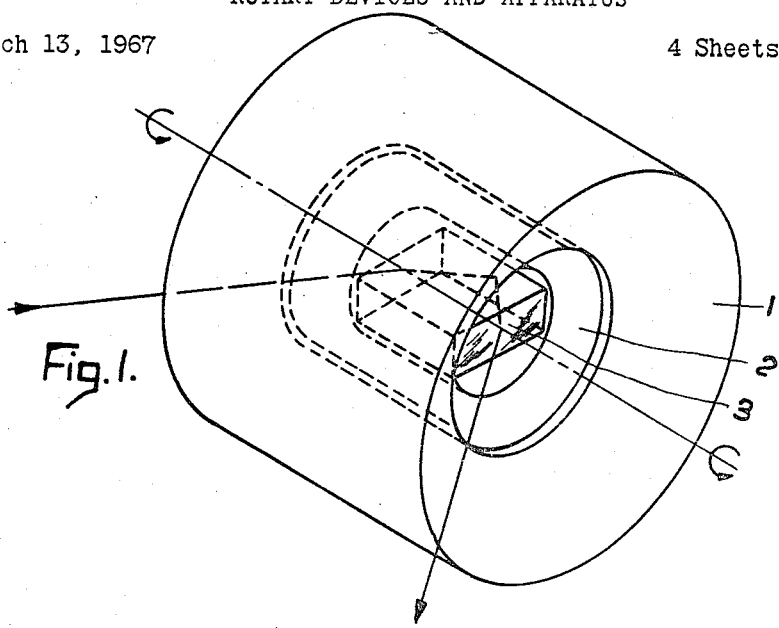
Figure 2:
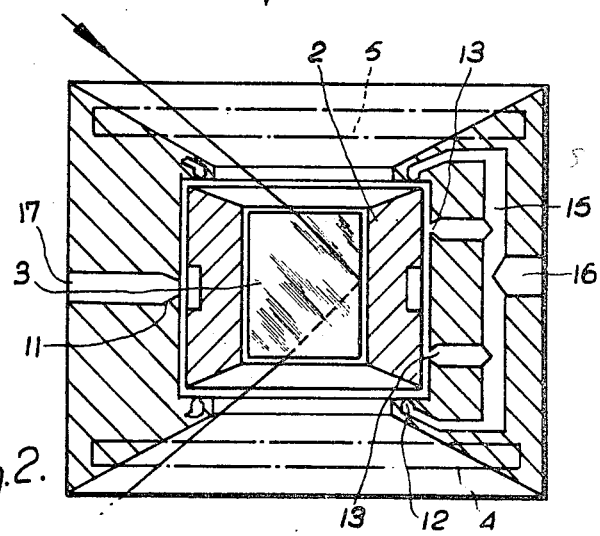
Figure 3:
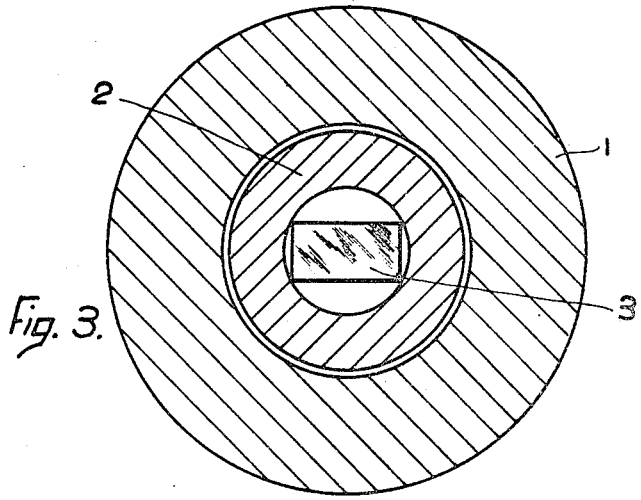
Figure 4:
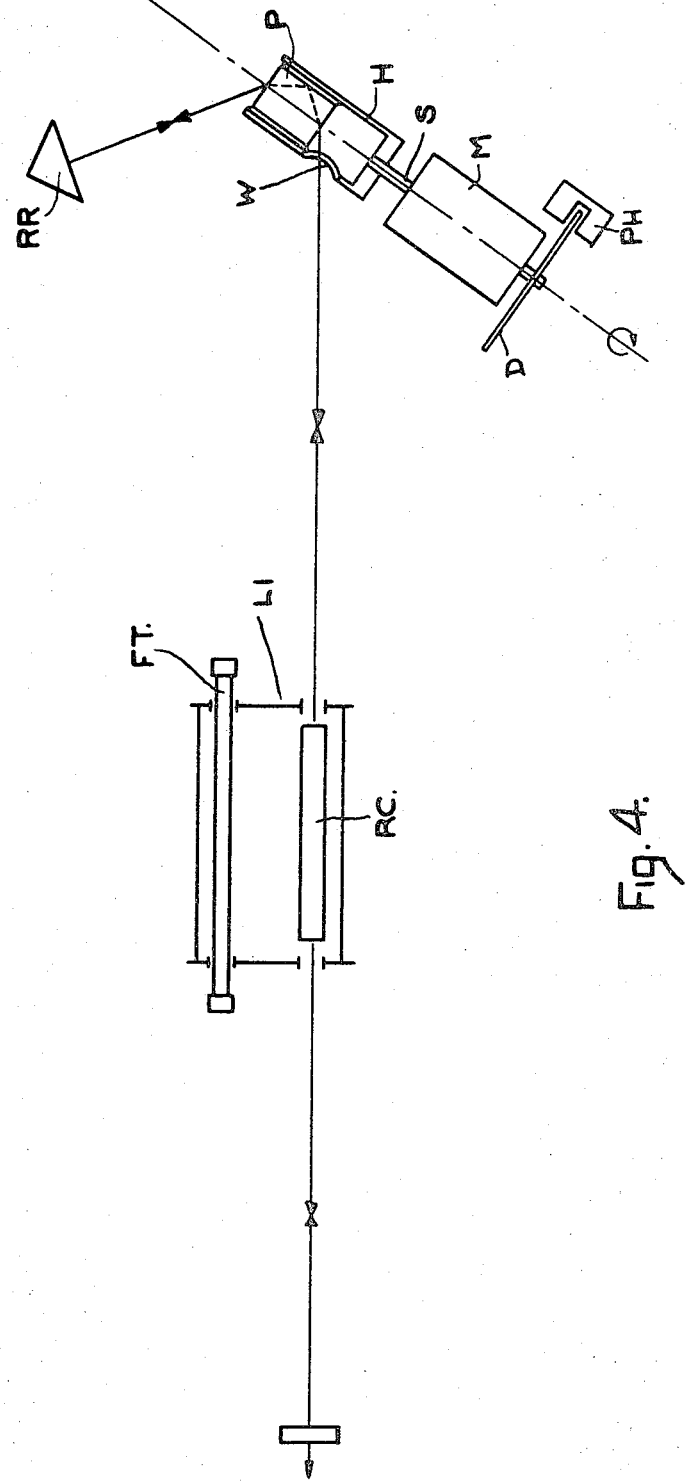
Figure 5:
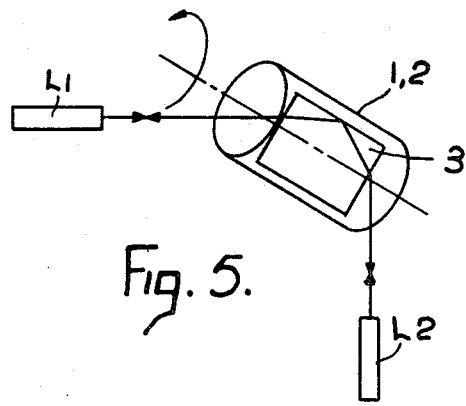
Figure 7:
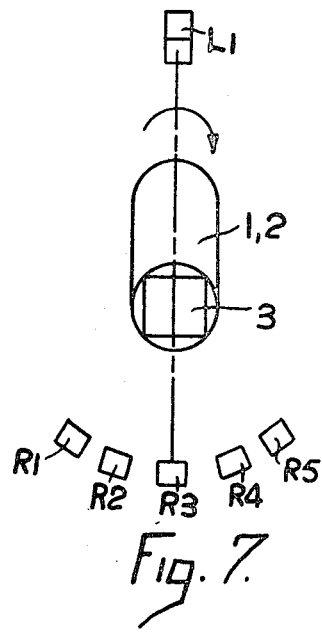
Figure 6:
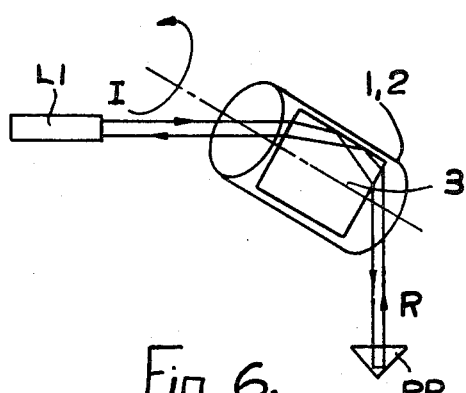

The various features and advantages of the invention will be apparent from the following description taken in conjunction with the accompanying drawings of which:

FIG. 1 is a perspective view of one form of apparatus in accordance with the invention, FIGS. 2 and 3 are respectively axial and radial sections of the apparatus of FIG. 1, FIG. 4 is a schematic diagram of a laser system incorporating the apparatus of FIGS. 1 to 3, FIG. 5 is a schematic diagram of a modified form of the laser system of FIG. 4 providing gain switching, FIGS. 6 and 7 illustrate two further modifications of the system of FIG. 4, and FIGS. 8, 9 and 10 illustrate three modifications of the apparatus of FIGS. 1, 2 and 3 using different forms of optical element.

The apparatus illustrated in FIGS. 1 to 3 of the drawings comprises a cylindrical stator 1 and a similar rotor 2, the latter being hollow and receiving within it an optical member in the form of a reflective prism 3, the end faces of which are exposed at opposite ends of the rotor 2. The rotor and stator may be those of an electric motor or of a turbine, the presently preferred form being an air turbine which will be described in greater detail later with reference to FIG. 2. The end faces of the rotor and stator may be flat and flush with the end faces of the prism 3 or they may slope outwardly as shown in FIG. 2, to leave a clearance angle of 120°. The angle of slope should in any case be such as to permit the angle of incidence of the impingement beam with the end face of the prism to be equal to the Brewster angle in order to eliminate loss by reflection from the end surface of the prism. Windows 4 and 5, indicated in dotted lines, may be mounted in the end faces of the stator and the bearing arrangements between the rotor and stator are of annular form and are located either at or inwardly of the end faces of the rotor so that they do not interfere with the optical paths of the incident and emergent beams. Such bearing arrangements may take any one of a variety of different forms. It is however essential that they act effectively between the curved cylindrical outer surface of the rotor and adjacent inner surface of the stator.

The prism 3 may be of rectangular section as shown in FIGS. 1 to 3 of the drawings or it may be of polygonal section.

The prism 3 may either be mounted as shown in FIG. 1 with the axis of rotation of the rotor passing between the opposite major faces of the prism or it may be mounted with such axis normal to such opposite faces. In certain applications the prism may be tilted with respect to the axis of rotation by a small angle. Each of these variations in the mounting of the prism produces a variation in the scan of the reflected beam as a result of rotation of the rotor.

The preferred form of rotating arrangement, or motor, is an air turbine and the preferred form of bearing between the rotor and stator is an air bearing. These are illustrated in FIG. 2 wherein the rotor 2 has a vaned annular recess 10 in register with an inlet nozzle 11 for driving air in the stator 1 and a corrseponding outlet nozzle in stator 1 which is not visible in the section shown in FIG. 2. The inner cylindrical wall surface of the stator 1 has a greater axial length than the outer wall surface of the rotor 2 so that a short length of this inner wall surface extends beyond the rotor at opposite ends thereof. In this short length of wall surface are formed, at diametrically opposite points and at both ends of the stator, inlet orifices 12 for bearing air, the orifices being arranged to direct jets of air on to the opposite ends of the rotor to maintain it in the bore of the stator. Axially inwardly of the orifices 12 and on opposite sides of the inlet nozzle 11 a plurality of further inlet orifices 13 for bearing air which are arranged to direct jets of air against the cylindrical outer surface of the rotor to maintain the rotor centralised in the bore of the stator. The orifices 12 and 13 are connected by ducts in the body of the stator to a common inlet duct 15 for bearing air which opens at a port 16 in the outer surface of the stator for connection to a suitable supply of air under pressure. The nozzle 11 for the driving air is also connected to a port 17 in the outer surface of the stator for connection to a suitable source of air under pressure.

The driving and bearing arrangements have been omitted from FIGS. 1 to 3 for simplicity of illustration and have only been shown fully in, respectively, the left hand half and the right hand half of FIG. 2 for the same reason.

With an air turbine of the form above described rotating the optical member 3, it has been found possible to operate the arrangement at a speed of 2,000 revolutions per second using an optical member 3 of sufficient size to give a working aperture of one centimetre. It will be appreciated that a gaseous fluid other than air could be employed for driving and/or bearing purposes.

The construction of rotating arrangement or motor above described is suitable for use whenever it is desired to leave the end faces of the rotor, whether the rotor is hollow or not, free from obstruction by bearings or other mechanical arrangements and is particularly useful when the rotor is hollow and serves as a housing for an optical element.

It will be appreciated that in its application to a laser system the arrangement described above only provides part of the optical resonant path over the small angle of rotation during which the prism is correctly oriented with respect to the remainder of such optical resonant path so that obstruction of the end faces of the prism can be tolerated if such obstruction is only effective over those angles of rotation during which the optical resonant path is not completed by the prism.

Thus an alternative form of housing and driving arrangement for the prism of other optical devices may be used in such application as illustrated in FIG. 4 of the drawings which is a schematic diagram of a Q switched ruby laser system embodying such an alternative arrangement.

In FIG. 4 the housing and driving arrangement for the prism comprises an electric motor M of which the rotor shaft S has mounted on the outer end thereof a tubular housing H which is open at its end remote from the motor shaft S. The wall of housing H has a window or aperture W formed in it and the prism P is mounted between such aperture W and the open end of the housing H with such orientation that the optical resonant path through the prism, over the angle of rotation during which it is effective, also passes through the aperture W so that the wall of housing H does not impede the operation of the prism.

The opposite end of rotor shaft S carries a disc D cooperating with a photocell arrangement PH to provide phasing signals for controlling the operation of a flash tube FT that pumps the ruby RC of the laser head L1.

In operation of the system FIG. 4 a pulsed light beam I from the laser amplifier unit L1 passes through the aperture W, is refracted, internally reflected and re-refracted by the prism P and the reflected beam R emerges from the open end of housing H in a direction to impinge upon and be reflected back along its course by a roof reflector RR. The beam reflected by RR follows the same path through prism P as the incident beam I but in the opposite direction and is returned to the laster unit L1 along the path followed by the incident beam I. The operation of the flash unit FT under the control of the phasing signal generated by the photocell arrangement PH ensures that the light pulse from the laser unit L1 impinges upon housing H when the aperture W is in correct rotary position to pass such pulse into the prism P. With rotational speeds of the housing H of the order of 250 per second the switching speed of the laser system is limited to this same order.

The embodiment of FIGS. 1, 2 and 3 may be used in place of that described in connection with FIG. 4 in the laser system of FIG. 4, and the examples of how such a substitution can be employed are illustrated in FIGS. 5, 6 and 7 which will now be described.

In the arrangement of FIG. 5, a beam of light I from a first laser amplifier unit which is indicated by the block L1 and which may be the same as that shown in FIG. 4, is directed at the appropriate angle into one open end of a prism mounting and rotating arrangement 1, 2 of the form shown in FIGS. 1, 2 and 3 and the reflected beam R emerging from the opposite end of the arrangement, instead of being reflected back into the prism by a roof reflector, as in the arrangement of FIG. 4, is directed into a second laser amplifier unit L2 similar to laser unit L1 and pulsed in timed relation to the pulsing of laser unit L1 so that the two units are coupled by the prism 3 to produce a gain switching effect.

In the arrangement of FIG. 6, the beam of light I from the laser unit L1 is directed at the appropriate angle into one open end of a prism mounted and rotating arrangement 1, 2 of the form shown in FIGS. 1, 2 and 3 and the reflected beam R, upon emergence from the opposite end of the arrangement, is directed into a reflective prism RP in such a manner that it is internally reflected from two surfaces of the prism RP and emerges in a direction parallel to, but spaced from, its path of incidence on the prism and thus reenters the arrangement 1, 2 and is reflected back into the laser unit L1 but along a different path from that taken by the original light beam I emanating from the laser unit L.

In the arrangement of FIG. 7, a series of five reflecting prisms R1 to R5 is shown positioned along an arc centered on the axis of rotation of the rotor of a prism mounting arrangement 1, 2 of the form shown in FIGS. 1, 2 and 3. A light beam I from a laser unit L1 enters the arrangement 1, 2 and the reflected beam R emerging from the end of the arrangement 1, 2 remote from laser unit L1 is directed to scan the arc of reflecting prisms R1 to R5 cyclically as the rotor rotates. The principle of multiple reflectors arranged in the scan path may equally be applied to the type of prism mounting and rotating arrangement described in connection with FIG. 4.

Moreover, in the arrangements described above in connection with FIGS. 1 to 7 the optical member which is mounted in the rotating arrangement may be either a simple member having a single reflecting surface or a more complex member presenting a multiplicity of reflecting surfaces in sequence as the rotor rotates. A pentagonal prism, for example, having five internally reflecting surfaces may be employed and, with the rotational speed of 2,000 revolutions per second referred to above, the beam entering the prism rotating at this speed can be caused to scan through a given point with a repetition rate of 10 kc./s.

Figure 10:
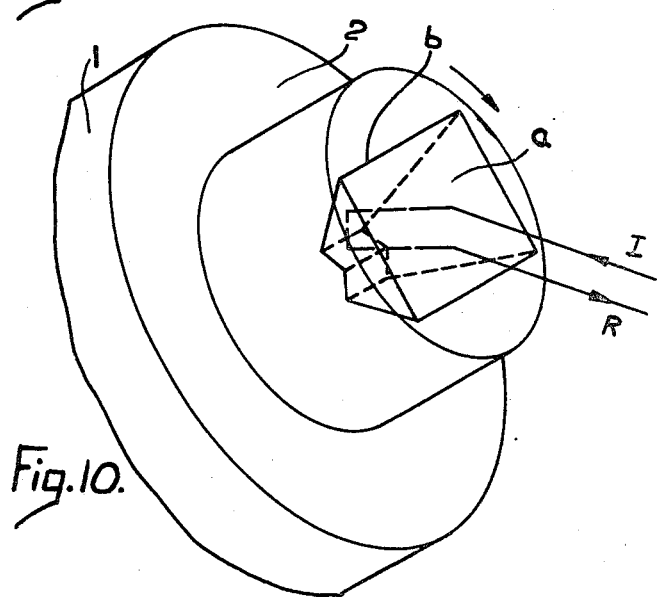
Figure 8:
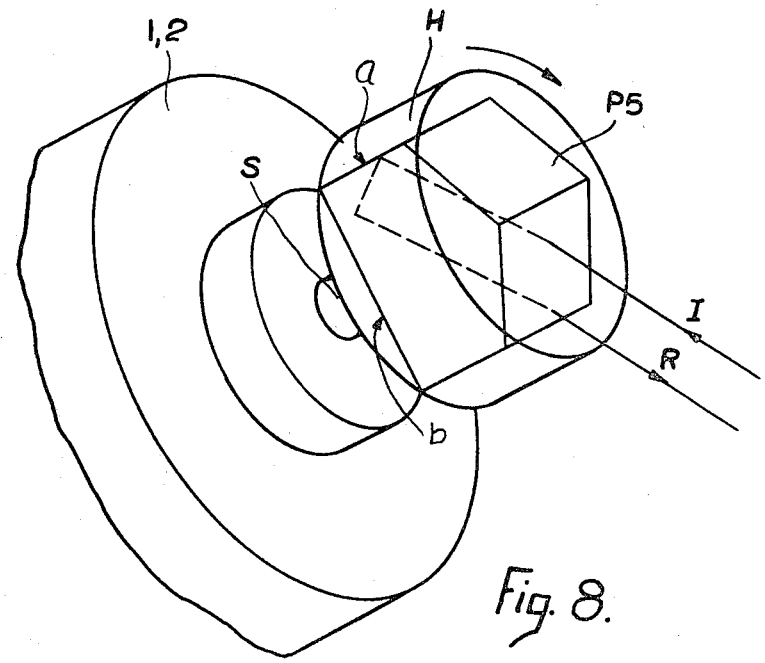
Figure 9:
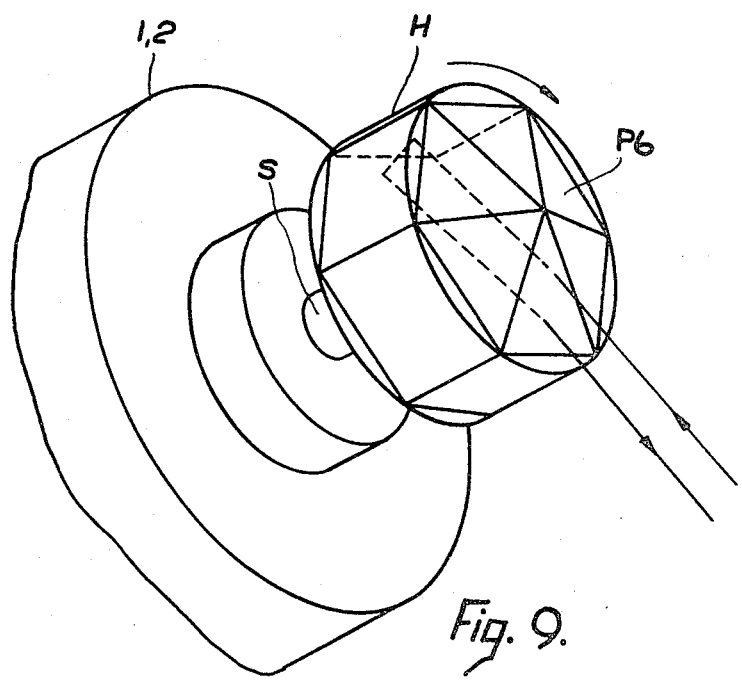

Instead of the mounting arrangement open at opposite ends as in FIGS. 1, 2, 3, 5, 6 and 7, or the arrangement open at one end and having a window in one side as in FIG. 4, a single ended mounting arrangement for the more complex reflecting prism may be used and examples of such single ended arrangements are shown in FIGS. 8, 9 and 10.

In the arrangement of FIG. 8, the rotor of an air turbine of the form described in connection with FIG. 2, instead of serving as a hollow mounting to receive the optical member, has a shaft S at one end on which is mounted a prism-mounting H which is open at its face remote from the shaft. In the mounting, a pentagonal prism P5 is symmetrically arranged with respect to the rotational axis, at least the side face $a$ of the prism P5 and the surface $b$ being internally reflecting to form a corner reflector. A light beam I, which may be from a laser amplifier unit such as the unit L1 of FIGS. 4 to 7, is directed into the open end of the mounting H to impinge upon one of the outwardly facing surfaces of the prism P5 at the Brewster angle and on passing through the body of the prism, is reflected back by the corner reflector formed by the adjacent reflecting surfaces of the prism, to pass through the same surface upon which the incident beam I impinges.

The arrangement of FIG. 9 differs from that of FIG. 8 only in that a hexagonal optical element P6 is mounted in the mounting H. With such an arrangement there are six outwardly facing surfaces upon which the incident light beam I impinges in turn as the mounting rotates and there is a pair of internally reflecting surfaces which can serve as a corner reflector for each of the six outwardly facing surfaces.

In the arrangements of FIG. 8 and 9 the shape of the outwardly facing part of the prism is in each case such as to give rise to undesired air turbulence when rotated particularly at speeds of 2,000 revolutions per second and such air turbulence tends to reduce the mechanical efficiency and optical performance of the arrangement. To overcome this difficulty an optical element such as that illustrated in FIG. 10 may be used. In the arrangement of FIG. 10 the optical element is of a form having a flat base facing outwardly and the end opposite to the base of reentrant shape to provide two surfaces at right angles to the side faces they abut.

The incident light beam I is directed to impinge upon the flat base surface $a$ of the prism, is reflected to impinge upon the internally reflecting side face $b$ which with the internally reflecting end surface $c$ at right angles thereto forms a corner reflector serving to reflect the beam back to the surface $a$ from which the reflected beam R emerges. The housing H is in this case mounted straight on to the end of the rotor 2 of the motor arrangement 1, 2 instead of on a shaft as in FIGS. 8 and 9.

We claim:

1. In a laser system of the type having at least one body of laser material, means for pumping said laser material and an assembly of reflectors, at least a predetermined one of said assembly of reflectors being at least partly constituted by an internally reflecting surface of an optical prism which is rotatable so that said reflecting surface is moved cyclically into and out of a position such that said assembly of reflectors supplies an optical resonant path for emissions from said laser material extending through said laser material, the improvement comprising:

a hollow cylindrical housing mounted for rotation about its longitudinal axis and having at least one open end, said prism being mounted within said housing and said prism having at least one refractive end intersected by said axis and having a plurality of internally reflecting side surfaces disposed facing and spaced from said axis and symmetrically arranged with respect to said axis, and means for rotating said housing about said axis so that when any one of said side surfaces is moved through a predetermined position said assembly of reflectors supplies an optical resonant path which extends through said open end of said housing and said refractive end of said prism at a finite angle with respect to said axis.

2. The combination defined in claim 1, wherein said refractory end is shaped and disposed so that said resonant path is incident thereon at the Brewster angle at least when any one of said side surfaces is in said predetermined position.

3. The combination defined in claim 1, wherein said prism has an internally reflecting end opposite said refractive end, each of said side surfaces abutting on a portion of the internally reflecting end which extends at right angles to that side surface to form a corner reflector with that side surface, said resonant path extending in both directions through said open end of said housing and said refractive end of said prism.

References Cited

UNITED STATES PATENTS

| Re. 25,227 | 8/1962  | Buck          | 350—7     |
| 1,006,230  | 10/1911 | Kollmorgen    | 350—23    |
| 3,350,156  | 10/1967 | Adams         | 350—7X    |
| 3,012,471  | 12/1961 | Herden        | 350—7X    |
| 3,398,379  | 8/1968  | Sims et al.   | 331—94.5  |
| 3,434,073  | 3/1969  | Forkerner     | 331—94.5  |
| 2,942,514  | 6/1960  | Brandon       | 350—7     |
| 3,217,623  | 11/1965 | Hotchkiss     | 350—7     |
| 3,316,348  | 4/1967  | Hufnagel et al. | 350—7   |
| 3,365,678  | 1/1968  | Maurer        | 331—94.5  |
| 3,370,176  | 2/1968  | Ett, et al.   | 350—7     |

PAUL R. GILLIAM, Primary Examiner

U.S. Cl. X.R.

350—7